United States Patent [19]

Klie et al.

[11] 4,440,067
[45] Apr. 3, 1984

[54] HYDROSTATIC ACTUATOR

[75] Inventors: Jürgen Klie, Sprockhövel; Hans-Wolfgang Stoll, Wetter, both of Fed. Rep. of Germany

[73] Assignee: G. Düsterloh GmbH, Sprockhoevel, Fed. Rep. of Germany

[21] Appl. No.: 104,906

[22] Filed: Dec. 18, 1979

[30] Foreign Application Priority Data

Dec. 22, 1978 [DE] Fed. Rep. of Germany ....... 2855566

[51] Int. Cl.³ .............................................. F01B 1/06
[52] U.S. Cl. .......................................... 91/491; 91/180
[58] Field of Search ................. 91/487, 180, 503, 481, 91/491, 497; 137/489

[56] References Cited

U.S. PATENT DOCUMENTS

| 2,360,816 | 10/1944 | Pasco | 137/489 |
| 2,426,100 | 8/1947 | Holden et al. | 91/491 X |
| 3,211,174 | 10/1965 | Weise et al. | 137/489 X |
| 3,921,503 | 11/1975 | Kubik | 417/218 X |

FOREIGN PATENT DOCUMENTS

| 521510 | 2/1956 | Canada | 91/499 |
| 2630673 | 1/1968 | Fed. Rep. of Germany | 91/491 |
| 1335065 | 6/1962 | France | 91/499 |

Primary Examiner—Edward K. Look
Attorney, Agent, or Firm—Michael J. Striker

[57] ABSTRACT

The hydrostatic actuator in a constant displacement type radial piston pump or engine includes two telescopically arranged component parts separating a high pressure side from a low pressure side for a working medium, and defining a variable pressure space therebetween. The pressure space communicates with the high pressure side via a flow restrictor and with the low pressure side via a pressure limiting valve. The telescopically arranged components parts act as piston-like members and adjust the gaps between the outer end faces of the component parts and their control surfaces of the actuator in response to the pressure in the pressure space.

14 Claims, 9 Drawing Figures

HYDROSTATIC ACTUATOR

BACKGROUND OF THE INVENTION

The invention relates to a hydrostatic actuator of the type which has two movable component parts defining a variable gap therebetween and a hydrostatic adjustment device operated by working fluid and being springbiased to urge the two parts into a sealing position.

By a hydrostatic adjustment of the gap width, the gap is to be maintained as small as possible so that the variable hydraulic resistance will assume a very high value. In its practical application, this measure will achieve that only a limited overflow will be generated between the two components that normally sealingly engage each other and move relative to each other at a concomitant small friction, irrespective of the thermally and mechanically caused expansion of those components exerting an influence upon the gap width, and irrespective of wear. Pressing of the parts against each other is effected by way of a pressure-impinged member within a pressure-impinged space. Hydrostatic adjustment of play has found a preferred application within the scope of control of hydraulic motors and hydraulic pumps. In the latter machines, the adjustment devices separate the high-pressure side from the low-pressure side. The mechanically elastic biasing means influence the gap width of the components moving relative to each other during standstill and at the moment of starting up.

Hydrostatic actuators with stationary cylinder blocks of the category as constant displacement initially described are known in the construction of motors as well as of pumps, as constant displacement radial piston types as well as axial piston types. The radial piston types comprise mainly those with internally supported pistons, while the axial piston types comprise in the main machines with swash plates. In-line piston models may also have stationary cylinder blocks.

The state-of-the-art furthermore includes hydrostatic actuators such as fixed-vane actuators and gear-type actuators.

Furthermore, pressure-limiting valves are known with such hydrostatic actuators, provided for the avoiding of prohibited stresses caused by forces, torques or pressures and arranged in such a manner that, for instance, the pressure supplied to a motor cannot exceed a certain predetermined value. This measure will reliably preclude damage to components of hydrostatic actuators and/or of the mechanical drive usually arranged subsequent to these, even under extreme conditions, for instance in case of a sudden blocking.

Irrespective of these advantages of hydrostatic actuators versus other drive systems, the known actuators of this category still show a number of disadvantages. Several additional pressure-limiting valves are usually arranged outside of the actuator housing and will act only then, when the actuators are operated beyond the normal load range. Such pressure-limiting valves arranged outside of the actuator housing will then become voluminous and costly, especially with larger nominal cross sections. And it is just with larger nominal cross sections that a considerable expenditure in respect of manufacture and design will be necessary to connect the pressure-limiting valves with the hydrostatic line systems by means of piping and/or hoses as well as threaded joints. In this context, it is certainly possible that with actuators of working-medium flows of about 80 dm$^3$/min up to approximately 1000 dm$^3$/min, the expenditure for the connection of the pressure-limiting valves will be larger than the expenditure for the valves themselves.

SUMMARY OF THE INVENTION

The invention is therefore based upon the task of simplifying a hydrostatic actuator of the, in respect of the construction expenditure for the controls, and of concomitantly perfecting the hydrostatic adjusting device so that no overloading of the actuators need be feared.

In keeping with these objects, and others which will become apparent hereafter one feature of the invention resides, in the hydrostatic actuator of the above described type, in the provision of hydrostatic means for adjusting the gap including a pressure space communicating with a high pressure side of the actuator via a flow restrictor and with a low pressure side via a pressure limiting valve, and a spring biased pistion like member coupled to one of the component parts and cooperating with the pressure space to move the one component part relative to the other component part in response to the pressure in the pressure space. It is of importance within the framework of the basic idea as per invention, that the pressure within the pressure space, which is a codeterminant for the gap width between the rotating and stationary components of the actuator, can now be reduced with the aid of at least one pressure-limiting valve and relative to the flow of the working medium through a small nominal section commutated by the control device, so that upon exceeding of the permissible maximal pressure, the components moving relative to each other will not be pressed against each other, but rather relieved as consequence of the forces acting upon them. Pressure relief resulting concomitant with a widening of the gap will thus create larger by-pass sections allowing direct passage of the working medium from the high-pressure side to the low-pressure side. The restrictor is kept comparatively small in respect of its cross section for the flow. Nevertheless, a rapid pressure build-up to the value of the working pressure will ensue in the pressure space, since the total volume of the pressure space and of the connecting lines up to the restrictor is also of limited dimension. The restrictor will furthermore preclude a rapid supplementation of pressure from the pressure-spaces, as a result of which the pressure-limiting valve may also be kept small as to its nominal dimension. The design will determine use of one restrictor or, in case of reversible operation, of several restrictors, and this will serve to limit the flow of the working meadium to a low value by means of the pressure-limiting valve. A small flow of the working medium also, so that in case of the overflow system being supplied, no harmful effects will result. Furthermore a higher back pressure is avoided before the pressure-limiting valve.

If the pressure within the pressure space, minus the pressure of the low-pressure side, now exceeds the equivalent set at the pressure-limiting valve, the pressure-limiting valve will open so that a further rise of the pressure within the pressure stage is no longer possible. On the contrary, the components are now being relieved and the gap width enlarged so that larger flow sections will result in the gaps, allowing a direct flow of the working medium from the high to the low-pressure side. With the high-pressure in the system then falling again, the pressure within the pressure space will also become lower. The pressure-limiting valve will close and the components will be pressed against each other with the gap width becoming smaller.

The arrangement as per invention thus functions in a manner similar to a pilot-operated pressure-limiting valve, with the pilot function being performed by the pressure-limiting valve of small nominal section and the main function by the gap-adjusting components themselves. The pressure-limiting valve may be of the constant or adjustable-pressure type. Its discharge will terminate either in the overflow-space or in a zone of the lesser pressure.

An advantageous embodiment of the invention, suitable for reversible operation, is characterized by the pressure space of the adjusting device being connected to the low-pressure side or to the overflow space through at least one pressure limiting valve, and to the high-pressure side of the actuator through a change-over valve with interposed restrictor or with subsequently arranged restrictors. The change-over valve is designed herein for the function of connecting the pressure space with the pressure-loaded sections in such a manner that the respective higher pressure will always prevail within the former. This embodiment is of importance particularly with motors, since in these the change of rotation is accomplished by changing the high and low-pressure side.

As far as only one pressure-limiting valve is provided, a further advantageous embodiment of the invention is characterized by the pressure space being connectable to the respective low-pressure side over a pressure limiting valve and check valves arranged after the latter. The advantage of only one pressure-limiting valve is the simple and exact setting of the pressure limit for both rotational directions of an actuator. The maximal pressure may then be set at the pressure-limiting valve for instance with the aid of a threaded screw or by the insertion of washers. The check valves which will open already with very small differential pressures will prevent short-circuiting of the working medium between the pressure-loaded sections. They will also require only a small pretensioning of the spring. In given instances, the spring tensioning may be dispensed with.

In many applications it is desirable or necessary to provide for differing pressure limits for both directions of rotation. An advantageous embodiment of the invention is characterized for this purpose by the pressure space being connected by one respective pressure-limiting valve, with the low-pressure side and the high-pressure side respectively. In this embodiment, the check valves for preventing a short-circuiting of the working medium can thus be dispensed with.

In a hydrostatic actuator, provided with a stationary cylinder block, with the passages leading to the cylinders ending on one side at the face of the cylinder block which forms the control level, the face being provided with two control rings, rigidly attached to the eccentric of the actuator shaft and dividing the inner annular space from an outer annular space, the rings allowing telescoping along the longitudinal axis of the actuator shaft and wherein, under the influence of the elastic returning force as well as by the pressure of the working medium within a pressure space formed between the control rings, the rings, with their opposite face sides, will be in sliding contact with the control level on one hand and the opposite area of the actuator housing on the other, the idea at the core of the invention will be developed further with advantage by the pressure space between the control rings on one hand being connected with the annular spaces through a change-over valve and an interposed restrictor, and, on the other, over a pressure-limiting valve with subsequently arranged check valves, wherein the change-over valve with restrictor and the pressure limiting valve as well as the check valves are integrated into the control ring which is in sliding contact with the control level.

A particularly advantageous embodiment as also reflected by a very simple arrangement of all bores, is characterized in an arrangement with only one pressure-limiting valve, by the pressure limiting valve, and the check valve, providing a connection with the inner annular space, being located within axial bores that to a great extent parallel the longitudinal axis of the actuator shaft, and by the check valve forming a connection to the outer annular space being located within a radial bore extending approximately parallel to the control level. All valves are provided herein within only one control ring. Machining of the bores and inserting of the various valves is simplified thereby.

A further embodiment, preferred in respect of the change-over valve is characterized by the change-over valve being located within a radial bore of the control ring which is in sliding contact with the control level, the radial bore running approximately parallel to the control level, the change-over valve being connected to the pressure space over a restrictor which forms a part of an axial bore extending approximately parallel to the longitudinal axis of the actuator shaft.

With a hydrostatic actuator having a stationary cylinder block, with the passages leading to the cylinders ending on one side at the face of the cylinder block which forms the control level, the face being provided with two control rings rigidly attached to the eccentric of the actuator shaft and dividing an inner annular space from an outer annular space, the rings allowing telescoping along the longitudinal axis of the actuator shaft, and wherein, under the influence of the elastic returning force as well as by the pressure of the working medium within a pressure space formed between the control rings, the rings, with their opposite face sides, will be in sliding contact with the control level on one hand and the opposite area of the actuator housing on the other, a suitable design is furthermore perceived by integrating both pressure limiting valves with the control ring which is in sliding contact with the control level, wherein the pressure-limiting valve providing a connection with the inner annular space is located in an axial bore running approximately parallel to the longitudinal axis of the actuator shaft, and the pressure limiting valve providing a connection with the outer annular space being located within a radial bore running approximately parallel to the control level.

With a hydrostatic actuator with a stationary cylinder block, with the passages leading to the cylinders ending on one side at the face of the cylinder block which forms the control level, the face being provided with two control rings rigidly attached to the eccentric of the actuator shaft and dividing an inner annular space from an outer annular space, the rings allowing telescoping along the longitudinal axis of the actuator shaft and wherein, under the influenece of the elastic returning force as well as by the pressure of the working medium within a pressure space formed between the control rings, the rings, with their opposite face sides, will be in sliding contact with the control level on one hand, and the opposite area of the actuator housing on the other, another possibility for arranging the pressure-limiting valves exists as per invention, by locating the respective pressure-limiting valves within axial bores running approximately parallel to the longitudinal axis of the actuator shaft, which are connected to the annular spaces by short radial bores. This design, as well as the embodiment previously described, is of the particular advantage that the bores required for the installation of the pressure-limiting valves can be produced at relatively low expenditure although ample lengths of installation for the springs of the valves will still result. The advantage of large lengths of installation is the precise adjustability of the spring force, In the embodiment of a hydrostatic actuator as discussed afore, it must be considered in respect of the precision in limiting the maximum pressure that the power conditions at the control ring which is in sliding contact with the control level, will alternate during rotation at the double driving frequency of the driven passages leading to the cylinders. Pressure limiting is thus dependent upon the angle of rotation. An acting of the pressure limiting independent of the angle of rotation can be achieved when it is not the control ring in sliding contact with the control level which will lift away from the opposite surface due to the forces exerted by an excess pressure, but rather the control ring in sliding contact with the opposite area on the actuator housing, since no passages are present in the latter arrangement.

As per invention, this is accomplished by the pressure space being connected with an annular groove by at least one connecting passage which is provided within the face side of the control ring in sliding contact with the opposite area of the actuator housing. Thus, a counterpressure to the contact pressure is built up in the annular groove from the pressure space, so that the pressure of the control ring against the opposite face with which it is in sliding contact, is reduced to the minimum required to ensure sealing. The reduction in pressing the control ring against the opposite face has also the advantage the friction is reduced and thus the overall effficiency of the actuator is increased.

As per a further feature of the invention, precision in setting the pressure limitation can be perfected by providing an annular groove in the face of the control ring which is in sliding contact with the opposite area of the actuator housing, the annular groove being connectable be a change-over valve in the control ring with either the inner annular space or the outer annular space. The pressure medium for the buildup of the counterpressure in the annular groove is thus not taken from the pressure space any more, but it will flow directly from one of the annular spaces through the appurtenant change-over valve, flowing in the respective instance from that annular space in which the higher pressure prevails. This measure will preclude any alternating influence between the counterpressure in the annular groove and the pressure-limiting system.

With a hydrostatic actuator with a stationary cylinder block, with the passages leading to the cylinders ending on one side at the face of the cylinder block which forms the control level, which has a control plate connected to the actuator shaft with control grooves arranged opposite to the control level, the grooves being connected on one side with an annular space at the periphery of the control plate, and on the other with an annular groove in the axially displaceable pressure plate, a further development of the basic idea of the invention consists in having the pressure space formed by a central posterior recess in the pressure plate, with a trunnion of the actuator housing containing the pressure-limiting valve connecting the pressure space with the overflow space of the actuator so engaging the recess of the actuator housing that a seal is formed thereby, the trunnion being connected over the change-over valve in the pressure plate, on one hand with the annular groove, and on the other with the peripheral annular groove.

Herein, the pressure impingement of the passages leading to the cylinders is effected over a rotating control plate with control grooves, or control lobes for instance, which are connected though passages in the control plate with the outer annular space on one hand, and with an annular groove on the other. The annular groove is located within an axially displaceable pressure plate. The pressure connections may optionally be connected with the supply or return line. Corresponding recesses or lobes in the control plate will alternatingly connect the passages leading to the cylinders with the supply and return line.

Adjustment of the play is made by the axially displaceable pressure plate. For this purpose, it is fitted with a central cylindrical posterior recess which by a system of bores and with interposition of the change-over valve is always impinged upon by the higher pressure of the pressures applied to the pressure connections. The pressure in the pressure space is limited herein by a pressure-limiting valve that can be adjusted externally. If the pressure in the pressure space exceeds the value set at the pressure-limiting valve, the valve will open and the pressure medium may flow from the pressure space into the overflow space. The hydrostatic axial contact pressure of the pressure plate is augmented by a spring element provided between the pressure plate and the closing cover, such as for instance a diaphragm spring.

The most essential differences between this embodiment and the embodiments discussed before can be seen in the fact that the pressure limitation is integrated into the controls but not into the control rings, it is herein adjustable from the exterior. Control is effected by a rotating control plate. Pressure relief of the pressure space over the pressure-limiting valve is made into the overflow space and not to the side with the lower pressure. The pressure-limiting valve and the change-over valve are designed as stationary components which neither rotate nor oscillate with the control system. The advantage of this design lies in its simple construction and thus in a moderate expenditure. It is less defect-prone as it can be installed in a better way. It is, furthermore, also conducive to easier servicing.

As per invention, a further variant exists in a hydrostatic actuator with a stationary cylinder block, with the passages leading to the cylinders ending on one side at the face of the cylinder block which forms the control level, the face being provided with a control ring rigidly mounted on the on the eccentric of the actuator shaft and dividing an inner annular space from an outer annular space the control ring being in sliding contact, under the influence of an elastic return force as well as of the pressure of the working medium, on one side with the control level and on the other with an axially displaceable grooved ring which, with a ring collar, is in sealing engagement with an annular groove of the housing cover, wherein the pressure-limiting valve as well as the change-over valve are located within the housing cover, and wherein the pressure-limiting valve is connected to the overflow space of the actuator.

In this instance too, the change-over valve and the pressure-limiting valve are stationary. Both components are in the housing cover, namely the end cover which is rigidly attached to the actuator housing with a spacer ring being interposed. Adjustment of play is essentially made by an axially displaceable grooved ring which, with its ring collar provided with seals engages an annular groove in the end cover, thus forming the pressure space. The control ring is designed with single control and which, by interposing a friction or non-friction bearing and an eccentric can be translatorily displaced in such a manner that a pressure-impinged outer annular space or an inner annular space will alternatingly be connected with the cylinder passages. In order to seal the eccentric toward the overflow space, it will, in the known manner, be fitted with a play-adjusting insert.

A particular advantage of this embodiment is the simple way of manufacture, especially on account of the bores being arranged at right angles to each other and thus easy to produce.

With both embodiments as finally described, it is of advantage versus the embodiments discussed at the beginning, that the flow of pressure medium which is released by the pressure-limiting valve is led into the overflow space. These embodiments will function fault-free also then when the actuators are driven as motors with a counterpressure in the return line. In both these embodiments it is of further advantage that a larger space is available for the installation of the pressure-limiting valve in particular, but also for the arrangement of the change-over valve. In some cases of application it may also be of advantage when the pressure limit may be adjusted from the outside. In other applications, it may, however, as described, be of advantage when it will not be possible to adjust the maximum pressure from the outside.

The design of the pressure-limiting valves in the controls of the most varied embodiments may be kept very simple, since their nominal dimension will be small due to the restrictor which will be present in all instances. As per invention, it will, however, be of advantage when the shutting-off element of every pressure-limiting valve consists of a ball pressed against the valve seat by a spring, or by a sealing cone.

The novel features which are considered as characteristic for the invention are set forth in particular in the appended claims. The invention itself, however, both as to its construction and its method of operation, will be best understood from the following description of specific embodiments when read in connection with the accompanying drawing.

DESCRIPTION OF THE PREFERRED EMBODIMENTS

Figure 1:
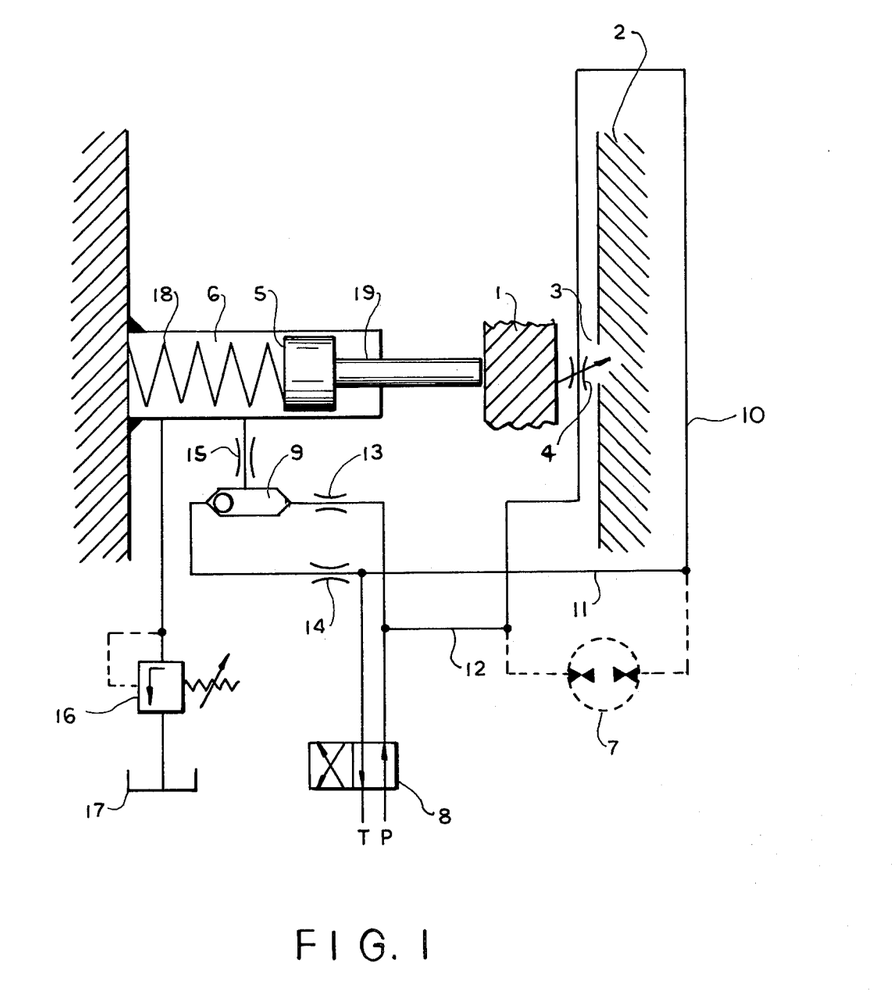
FIG. 1 is a schematic circuit of the hydrostatic adjustment of the gap width between two components of a hydrostatic actuator which move relative to each other.

Using the representation as per FIG. 1, the basic principle of a hydrostatic adjustment of the gap width will first be explained.

By the hydrostatic adjustment according to this invention is to achieve that the gap 3, formed by at least two components 1, 2, is held as small as possible so that the variable hydraulic resistance 4 will be of a very high value. In practical application, this measure will have the effect that, irrespective of thermally and mechanically caused expansions of the components exerting an influence upon the gap width, and irrespective of the wear, only a limited overflow will be generated between the components 1 and 2 that are sealing against each other and move relative to each other, with a concomitant limited friction. Pressing of the components 1 and 2 is effected by a pressure-impinged surface of a piston 5 movable within a pressure-impinged space 6.

A preferred application of such a hydrostatic gap-width adjustment can be found in the area of controls for hydraulic motors 7 and hydraulic pumps. Herein, they will separate the high-pressure side from the low-pressure side. In the schematic representation as per FIG. 1, one may proceed from a parallel arrangement of the play-adjusting components 1 and 2 and the pressure connections of the motor 7, or a pump, respectively.

The change of rotational direction by changing the high pressure side for the low-pressure side, is furthermore of particular importance with motors. The reversal is effected by a multi-way valve 8 whereby P becomes the pressure line and T the return line for the working medium.

The pressure space 6 is always connected by an interposed change-over valve, and irrespective of the direction of rotation and impingement, to the side of the higher pressure by line sections identified herein by reference numerals 10, 11 and 12. For the sake of completeness, the restrictor function of the supply line is shown within the framework of the schematic by the constant-flow throttles or restrictors 13, 14. These restrictors will be of effect only then, when the restrictor 15 between the change-over valve 9 and the pressure space 6 is dispensed with. This means that with provision of the restrictor 15, the restrictors 13 and 14 will be obviated.

The pressure space 6 is moreover so connected with a pressure-limiting valve 16 that the pressure in the pressure space 6 cannot exceed the value set or adjusted at the pressure-limiting valve 16.

Depending upon the construction of the hydrostatic actuator or, respectively, the control system provided therefor, the pressure-limiting valve 16 may be set at a constant value or be adjustable. The drain from the valve 16 is led either into an overflow space or reservoir 17 or into a line, not shown herein, in which the lower pressure prevails.

With non-reversible drives—preferably with hydraulic pumps—the change-over valve 9 may be forgone. At any rate, however, alternative use of either the restrictor 15 or the restrictors 13, 14 is recommended in order to limit the flow of the working medium through the pressure-limiting valve 16 to a low value. In order to ensure contact between the components 1 and 2 also when no pressure or very low pressures prevail, a spring element 18 is also provided, augmenting the hydrostatic contact pressure in the pressure space 6.

Due to the biasing forces, the components 1 and 2 will normally be in contact. At higher pressures in the high-pressure side of the gap 3, the pressure-limiting valve 16 will open and the pressure in the pressure chamber 6 will remain at the value as set at the pressure-limiting valve 16. If, however, the force exerted by the pressure in the gap 3 upon the piston element 19 will become larger than the sum of forces of the spring 18 and that exerted upon the piston element 19 by the pressure within the pressure space 6, the components 1 and 2 will be displaced to the left so that a larger gap 3 will result.

It can be recognized that this arrangement will function in a manner similar to a pilot-operated pressure-limiting valve, wherein, however, the pilot function is performed by the pressure-limiting valve 16 of small nominal section, the main function being performed directly by the play-adjusting components 1 and 2 themselves.

Figure 2:
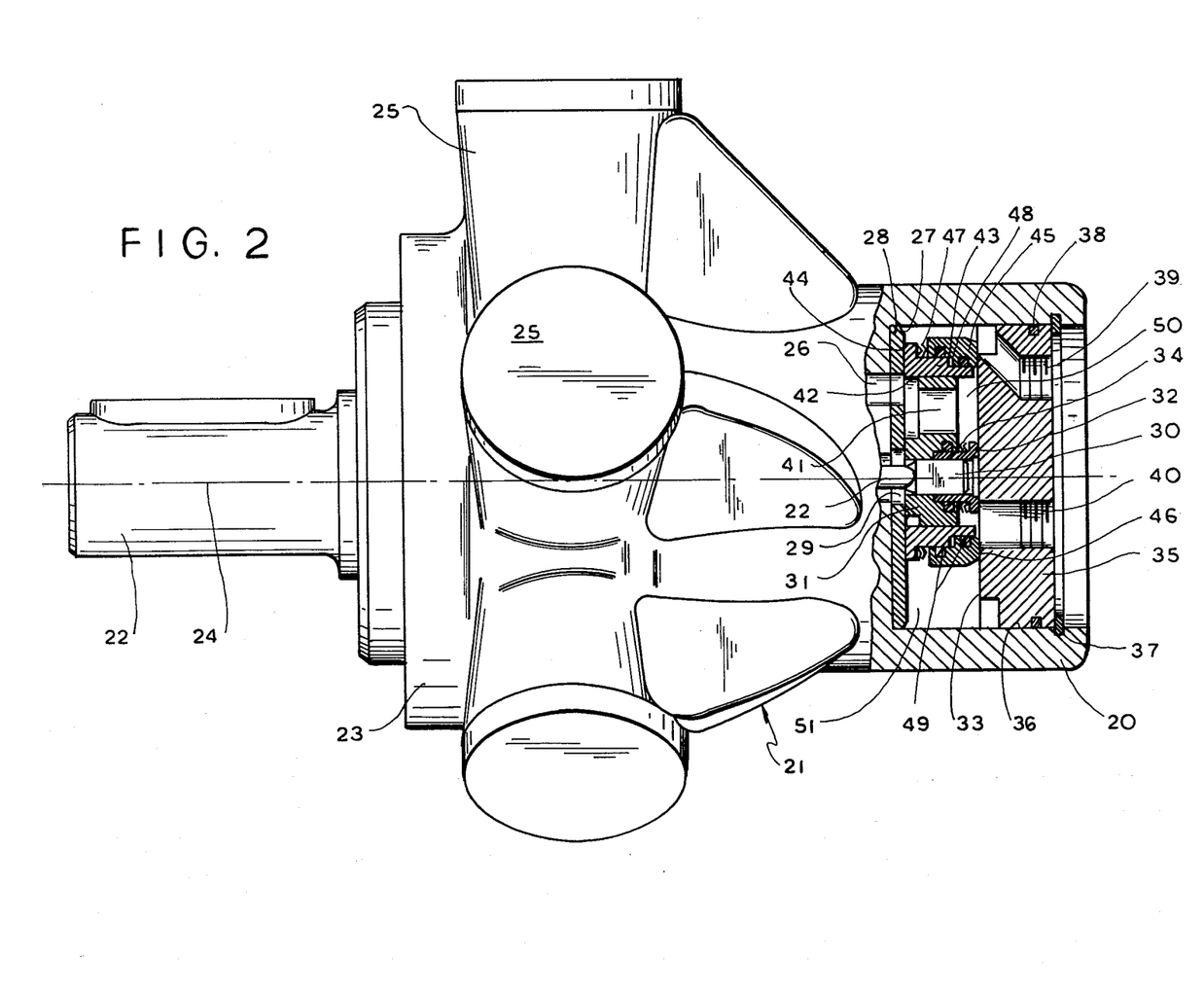
FIG. 2 is a partly cutaway side view of a part of a radial piston motor in vertical longitudinal section as to its control system.

In FIG. 2, reference numeral 20 denotes the housing of a radial piston motor which is shown in more detail only in relation to its control apparatus. Reference numeral 22 denotes an actuator shaft extending through a stationary cylinder block 23, and 24 reference numeral denotes the longitudinal axis of the actuator shaft 22.

The passages 26 leading to the cylinders 25 open into a control surface 27 at one face of the cylinder block 23, the control surface 27 being formed on a rotary control plate 28 located at the cylinder block 23. The latter has a central bore 29 through which the actuator shaft 22 extends. An eccentric 31 is rigidly mounted to the end 30 of the actuator shaft 22. The eccentric 31 abuts on one side directly on the control surface 27, and on the other, under elastic interposition of the pressure sleeve 32, on a counter face 33 of the actuator housing 20. Elasticity between the eccentric 31 and the pressure sleeve 32 is achieved by the springs 34. The counter face 33 is provided on an insert 35 which is inserted into a recess 36 of the actuator housing 20 and located therein by means of a spring washer 37. A seal ring between the insert 35 and the actuator housing 20 is identified by reference numeral 38. Intake passages 39 and discharge passages 40 are provided in the insert 35 for the working fluid. The function of the respective passages 39 and 40 will change according to the direction of rotation.

The eccentric 31, provided with at least one cutout, abuts on its periphery the inner side 42 of a control ring 43 a face 44 of which slides on the control surface 27. The control ring 43 is encompassed by another control ring 45 which with face side 46 is in sliding contact with the counter face 33. The sliding contact of the control rings 43 and 45 on the control surface 27 and the counterface 33 respectively is caused on one hand by the springs 47 and on the other by the pressure within a pressure space 48 between the control rings 43, 45.

Sealing between the two control rings 43, 45 is ensured by the seal rings 49.

On operating the motor 21, the control ring 43 is guided by the eccentric 31 on the actuator shaft 22, in such a manner over the control surface 27, that the passages 26 leading to the cylinders 25 will alternatingly be connected with an inner annular space 50 or an outer annular space 51, both of the latter on their part again being connected with the passages 40 and 39 in the insert 35, the passages being subjected to the respective higher or lower pressure.

Figure 3:
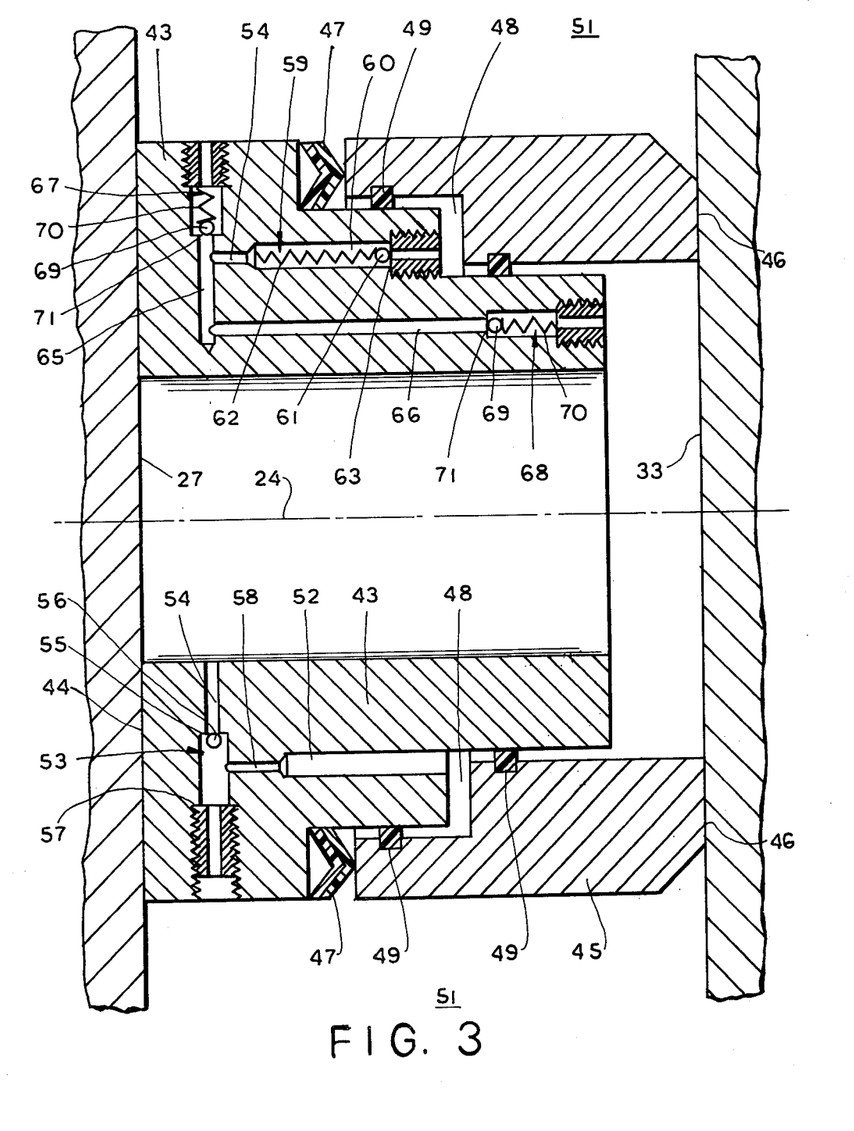
FIG. 3 is an enlarged representation of a first embodiment of the control system of FIG. 2, also in vertical longitudinal section.

As can be seen closer from the lower half of FIG. 3 in respect of the longitudinal axis 24 (the actuator shaft 22 and eccentric 31 have been omitted to maintain clarity in viewing the drawing) the pressure space 48 between the control rings 43 and 45, which is sealed against the inner annular space 50 and the outer annular space 51, is connected by an axial bore 52 running parallel to the longitudinal axis 24 with a change-over valve 35, located in a radial bore 54 extending through the control ring 43 near the control level 27, and connected on its part with the inner annular space 50 as well as the outer annular space 51. As shutting-off element, the change-over valve 53 is provided with a ball 55 which, depending upon the pressure prevailing in the annular spaces 50, 51, will be abutting either the valve seat 56 or the valve seat 57. The axial bore 52 leading to the pressure space 48 is designed narrowed-down in the zone of the change-over valve 53, thus forming the restrictor 58. The pressure within the pressure space 48 will correspond to the respective higher pressure of the pressures prevailing within the two annular spaces 50 and 51.

From the upper half, relative to the longitudinal axis 24, of FIG. 3, it can be seen that the pressure space 48 is moreover connected with a pressure-limiting valve 59 provided within the control ring 43. The pressure-limiting valve 59 is arranged in an axial bore 60 running parallel to the longitudinal axis 60. It has a ball-shaped shutting-off element 61 which is pressed by the compression spring 62 against the valve seat 63. The connecting passage 64 at the drain side of the pressure-limiting valve 59 is connected over the radial bore 65 and an axial bore 66 to two check valves 67 and 68. The check valve 67 opens in the direction of the annular space 51, and the check valve 68 in the direction of the annular space 50. Both have ball-shaped shutting-off elements which are pressed by the compression springs 70 against the valve seats 71.

During normal operation, a pressure will prevail within the pressure space 48 which is below the maximum pressure that can be set at the pressure-limiting valve 59, and which is so adjusted that the control rings 43 and 45 respectively, will be pressed against the control surface 27 on one side, and the counter face 33 on the other, in such a manner that they will slide over these. If the pressure prevailing within the pressure space 48, minus the pressure at the low-pressure side, exceeds the equivalent of the force exerted by the spring 62, the pressure-limiting valve 59 will open. A further rise of the pressure in the pressure space 48 is no longer possible. If the pressure in the pressure space 48 falls below the minimum pressure required for telescoping of the control rings 43 and 45, retracting of the control rings 43 and 45 will cause large flow sections to open up in the resulting gaps between the opposite face sides 44 and 46 of the control rings 45 and 45 on one hand, and the control surface 27 and the opposite face 33 on the other hand, allowing a direct flow of the working medium from the high-pressure side to the low-pressure side. With a drop in the high pressure of the system, the pressure in the pressure space 48 will also be reduced. The ball 61 will again be pressed by the spring 62 against the seat 63, forming a seal. Automatic telescoping of the control rings 43 and 45 will ensue, with this sequence being repeatable as often as desired.

Figure 4:
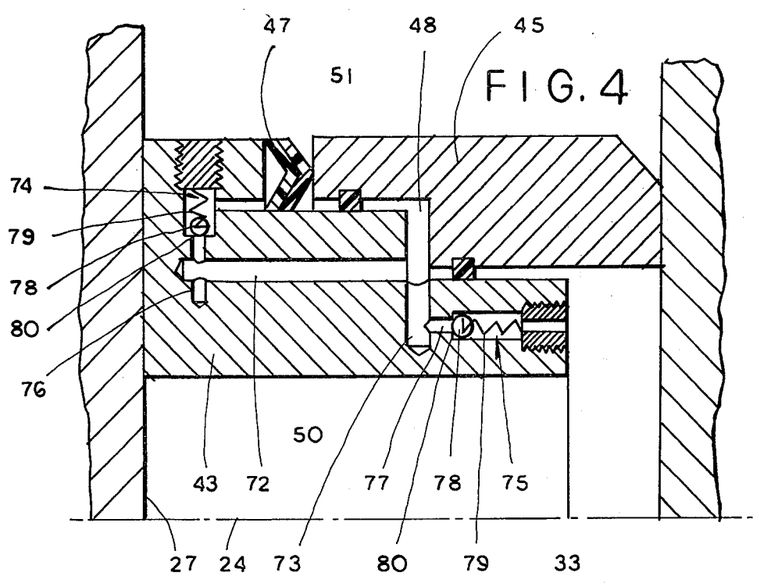
FIG. 4 is an enlarged representation of a second embodiment of the control system of FIG. 2, in vertical longitudinal section.

In the embodiment of FIG. 4, the pressure space 48 between the control rings 43 and 45 is connected by passages 72 and 73 to two pressure-limiting valves 74 and 75 provided within the control ring 43. The pressure-limiting valve 74 is arranged in a radial bore 76 which is approximately parallel to the control surface 27, and will open in the direction into the outer annular space 51. The pressure-limiting valve 75 is arranged within an axial bore 77 running approximately parallel to the longitudinal axis 24, and will open into the inner annular space 50. Both pressure-limiting valves 74, 75 are fitted with balls 78 as shutting-off organs, pressed by the springs 79 against the valve seats 80.

Figure 5:
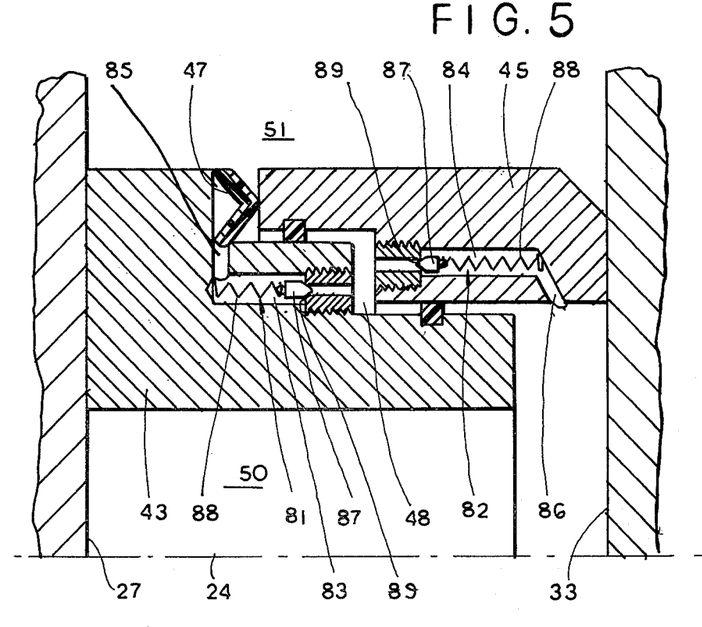
FIG. 5 is an enlarged representation of a third embodiment of the control system of FIG. 2, in vertical longitudinal section.

According to the embodiment of FIG. 5, two pressure-limiting valves 81 and 82 are provided, with the pressure-limiting valve 81 being arranged within the control ring 43 which is in sliding contact with the control surface 27, and the pressure-limiting valve 82 being located within the control ring 45 which is in sliding contact with the counter face 33. Both pressure-limiting valves 81 and 82 are located in axial bores 83 and 84 running approximately parallel to the longitudinal axis 24 of the actuator shaft 22, the axial bores 83 and 84 being in connection with the outer annular space 51 on one side, and the inner annular space 50 on the other, by means of the respective short radial bores 85 or 86. In this embodiment, the shutting-off elements of the pressure-limiting valves 81 and 82 are sealing cones 87 which are pressed against the valve seats 89 by the springs 88.

Figure 6:
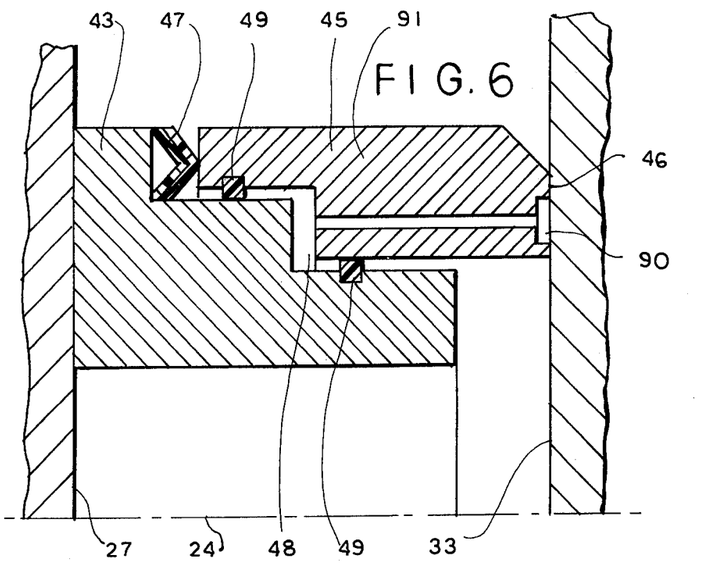
FIG. 6 is a fourth embodiment of the control system of FIG. 2 in an enlarged, vertical longitudinal section.

In the embodiment shown in FIG. 6, an annular groove 90 is machined into the face side 46 of the control ring 45 which is in contact with the counterface 33, the annular groove 90 being in connection with the pressure space 48 through an axial bore 91 provided parallel to the longitudinal axis 24 of the actuator shaft 22. This embodiment may be employed with the valve arrangements shown in FIGS. 3 to 5.

Figure 7:
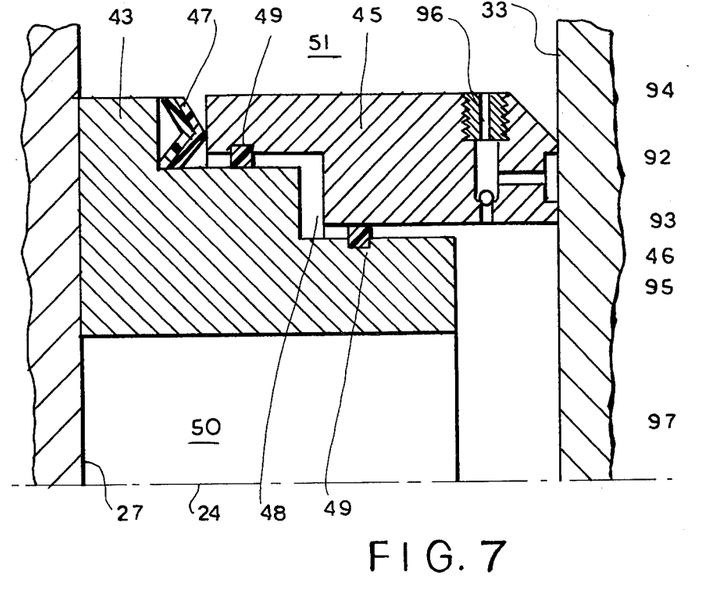
FIG. 7 is a fifth embodiment of the control system of FIG. 2, in enlarged vertical longitudinal section.

FIG. 7 depicts an embodiment wherein an annular groove 92 is also machined into the face side 46 of the control ring 45 which is in contact with the counterface 33. This annular groove 92 is, however, not connected to the pressure space 48. It is, moreover, connected through an axial bore 93 with a change-over valve 94 in the control ring 45. Thereby, the annular groove will, depending upon the respective higher pressure, be in connection either with the outer annular space 51 or the inner annular space 50. The change-over valve 94 has a ball-shaped shutting-off element 95 which oscillates between the valve seats 96 and 97. This embodiment, too, may be employed together with the valve designs as per FIGS. 3 to 5.

Figure 8:
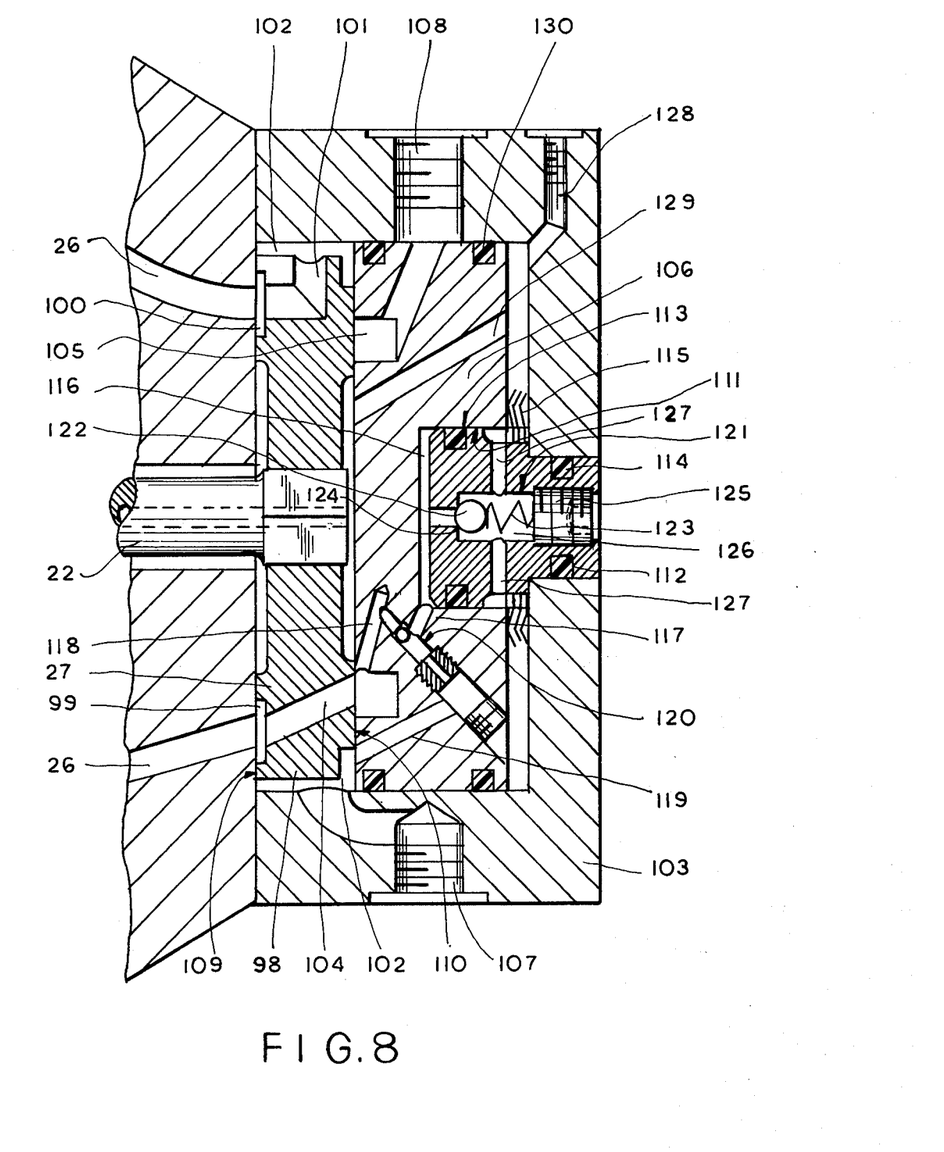
FIG. 8 is a sixth embodiment of the control system of a radial piston motor, in vertical longitudinal section.

The control device depicted in FIG. 8 may also be employed with a radial piston hydrostatic actuator, similar to that as indicated in FIG. 2.

The admission of pressure medium into the passages 26 leading to the cylinders in FIG. 8, ensues over a rotating control plate 98 rigidly mounted upon the actuator shaft 22. Kidney-shaped control grooves 99 and 100 are provided in the control plate 98, placed opposite to the ports of the passages 26 in the control surface 27.

The control groove 100 is connected by an angular passage 101 to an annular space 102 formed within the housing cover. The control groove 99 is connected by a passage 104 within the control plate 98 to an annular groove 105 in the pressure plate 106, with the latter being axially displaceable in the housing cover 103.

The connections 107 and 108 for the working pressure medium may optionally be connected with the supply or return line.

Adjustment of the width of the gaps 109 and 110 between the rotating control plate 98 and the non-rotatory control surface 27 on one hand, and the pressure plate 106 on the other hand, is made by the axially displaceable pressure plate 106. For this purpose, the pressure plate 106 is provided with a cylindrical recess 111 into which a trunnion 112 of the housing cover 103 will so engage that a seal is formed thereby. The trunnion 112 is sealed toward the recess 111 by a seal 113, and toward the housing cover 103 by a seal 114. A spring element 115, for instance a diaphragm spring, will press the pressure plate 106 towards the control plate 98 when no pressure or only limited pressures exist. A pressure space 116 is formed between the recess 111 and the trunnion 112 and will always be impinged upon by the higher pressure of the pressures applied to the connections 107 and 108, the pressure being exerted through a change-over valve 120 and bores 117, 118 and 119 in the pressure plate.

The pressure within the pressure chamber 116 is limited by an pressure-limiting valve 121 adjustable from the outside. The pressure-limiting valve 121 comprises a ball 122 which can be pressed by a spring 123 against the valve seat 124. The pretensioning of this spring 123 is made by means of a threaded bolt 125. The pressure-limiting valve 121 is located within a bore 126 in the trunnion 112, connected by radial bores 127 and a passage 128 in the housing cover 103 to the overflow space not shown herein.

The passage 129 connects the two sides of the pressure plate 106 the latter being sealed by seals 130 against the housing cover 103.

Figure 9:
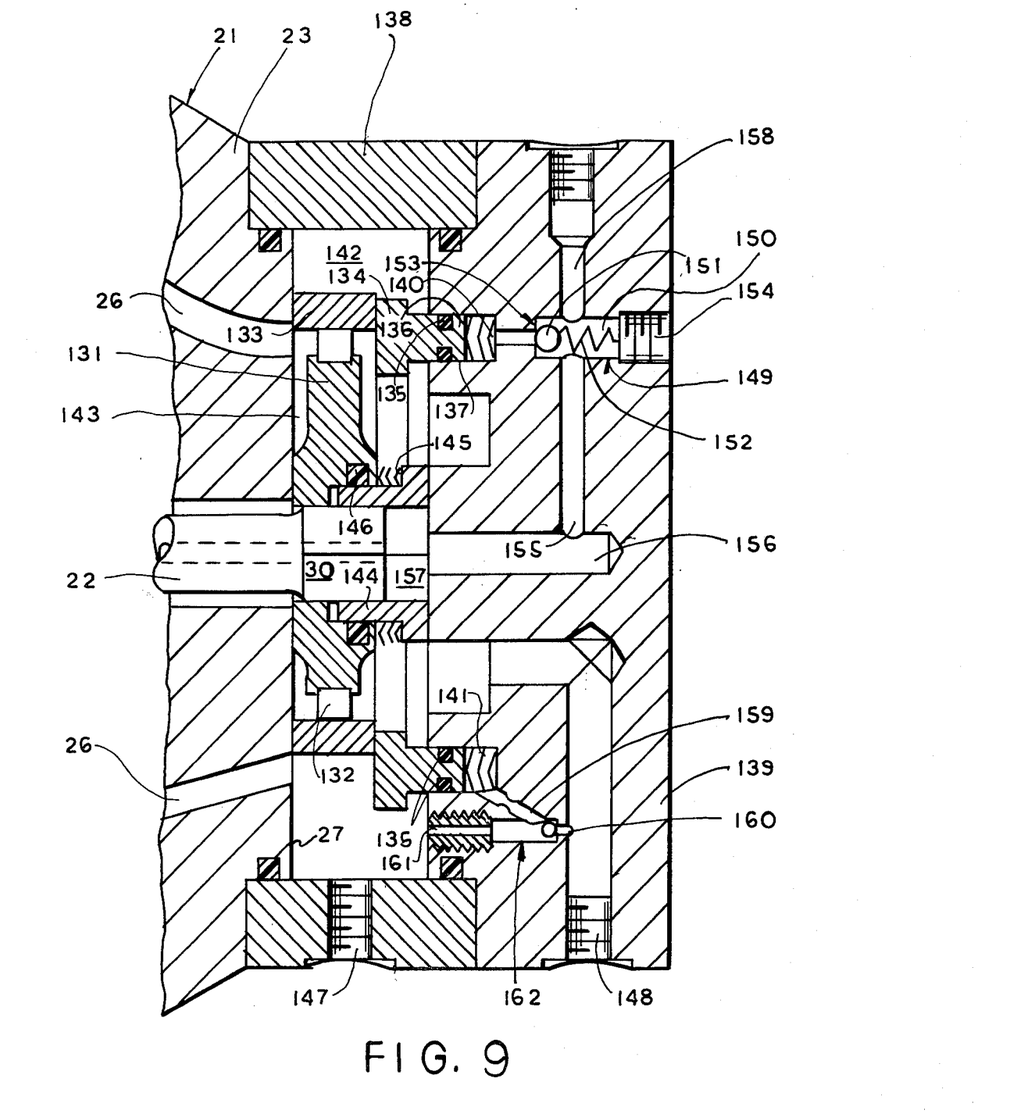
FIG. 9 is a seventh embodiment of the control system of a radial piston motor in vertical longitudinal section.

The control system depicted in FIG. 9 is, corresponding to the controls of FIG. 8, appurtenant to a hydrostatic actuator 21.

An eccentric 131 is set upon the end 30 of the machine shaft 22, the eccentric 131 being located within a control ring 133 with an anti-friction bearing 132 being interposed. The control ring 122 is, on one side in abutment with the control surface 27, and on the other side in abutment with the grooved ring 134 which with a ring collar 136 provided with seals 135 engages into an annular groove 137 of the housing cover 139 which, in turn, is connected with the cylinder block 23. The pressure space 140 is delimited by the ring collar 136 and the groove 137. A spring element 141 is arranged within the pressure space 140 which, when no pressure or low pressures prevail, will displace the grooved ring 134 towards the control surface 27.

With the actuator shaft 22 in rotation, the control ring 133 is translatorily displaced so that an outer annular space 142 or an inner annular space 143 will alternatingly be connected to the passages 26 in the cylinder block 23. In order to seal the eccentric 131 against the overflow space, a play-adjusting insert 144 is provided which is pressed against the housing cover 139 by spring elements 145 and sealed by a seal 146 against the eccentric 131.

The connections for the working medium to the annular spaces 142 and 143 are identified by 147 and 148.

The pressure space 140 is connected to a pressure-limiting valve 149 which is located within an axial bore 150 in the housing cover 139. The pressure-limiting valve 149 has as its shutting-off element a ball 151 which can be pressed by a spring 152 against the valve seat 153. The pretensioning of the spring 152 is made from the outside by a threaded bolt 154. The axial bore 151 is connected with the inner space 157 of the insert 144 via a radial passage 155 and an axial passage 156, and, via a further radial passage 158 with the overflow space which is not shown.

It may furthermore be noted that the pressure space 140 is connected by bores 159, 160 and 161 and through a change-over valve 162 with the working medium connections 147 and 148, this in such a manner that the pressure space 140 will always be impinged upon by the higher pressure of the pressures applied to the working-medium connections 147, 148.

It will be understood that each of the elements described, or two or more together, may also find a useful application in other types of constructions differing from the types described above.

What is claimed as new and desired to be protected by Letters Patent is set forth in the appended claims:

1. A hydrostatic actuator for use with a hydraulic motor or pump having a high pressure port and a low pressure port, said actuator comprising two component parts separating a high pressure side connected to said high pressure port from a low pressure side connected to said low pressure port, said parts being movable relative to each other and defining a variable gap therebetween, hydrostatic means for adjusting the width of said gap between an open position and a sealing position in which said high pressure side is sealed off from said low pressure side, said adjusting means including a pressure space communicating with said high pressure side via a flow restrictor and with said low pressure side via a pressure limiting valve, and a piston-like member constituted by at least one of said component parts and cooperating with said pressure space to move said one component part relative to the other component part in response to the pressure in said pressure space, said hydrostatic actuator further including a stationary cylinder block with an end face in the form of a control plate provided with openings communicating via passages to respective cylinders of the block, a rotary shaft arranged in the block and passing through the control plate, an eccentric secured to the end portion of the shaft behind the control plate, said adjusting means including a housing surrounding said control plate and defining a counteracting face juxtaposed to said control plate, said two component parts being in the form of two control rings mounted on said eccentric for joint rotation therewith, said rings being telescopically arranged relative to each other and defining said pressure space therebetween, one of said rings slidably engaging on said control plate and the other control ring slidably engaging the juxtaposed face of said housing, the contact surfaces of said rings with the control plate and said housing face defining variable gaps, said high pressure side being formed in the annular space between said housing and the outer walls of said rings and said low pressure side being formed in the interior of said two control rings, said two control rings being spring biased into a gap sealing position, said one control ring being formed with a change-over valve and with a restrictor connecting said change-over valve to said pressure space and with a pair of interconnected check valves, and said pressure limiting valve being coupled between the common point of said check valves and said pressure space.

2. An actuator as defined in claim 1, wherein said one control ring is in sliding contact with said control surface of said cylinder block and said pressure limiting valve and one of said check valves being arranged in axially directed bores while the other check valve being arranged in radially directed bore in said one control ring.

3. An actuator as defined in claim 2, wherein said change-over valves is arranged in a radially directed bore and said restrictor in an axially directed bore communicating with said change-over valve.

4. A hydrostatic actuator in a hydraulic motor or pump of a constant displacement type having a high pressure port and a low pressure port, said actuator comprising two component parts of said motor or pump separating a high pressure side connected to said high pressure port from a low pressure side connected to said low pressure port, said parts being movable relative to each other and defining a variable gap therebetween, hydrostatic means for adjusting the width of said gap between an open position and a sealing position in which said high pressure side is sealed off from said low pressure side, said adjusting means including a pressure space communicating with said high pressure side via a flow restrictor and with said low pressure side via a pressure limiting valve, and a piston-like member constituted by at least one of said component parts and cooperating with said pressure space to move said one component part relative to the other component part in response to the pressure adjusted by said pressure limiting valve in said pressure space.

5. An actuator as defined in claim 4, further including at least one check valve arranged downstream of said pressure limiting valve.

6. An actuator as defined in claim 4, including a stationary cylinder block defining control surface provided with openings communicating with respective cylinders of said block, a rotary shaft passing through said cylinder block and having at its end an eccentric supporting for joint rotation two control rings, a housing surrounding said control rings and defining therewith an outer high pressure side and an inner low pressure side, said control rings being telescopically arranged one on the other and being spring biased in axial direction to abut against said control surface and against the opposite surface of said housing, said control rings being shaped to form a pressure space variable in longitudinal direction, said pressure limiting valve and said check valves being arranged in the control ring which is in sliding contact with said control surface and said pressure limiting valve being arranged in a radial bore communicating with said pressure space and further including an additional pressure limiting valve extending in an axial bore communicating with said pressure space.

7. An actuator as defined in claim 6, wherein one of said pressure limiting valve is arranged in an axial bore provided in said one control ring and the other pressure limiting valve is arranged in an axial bore provided in the other control ring.

8. An actuator as defined in claim 4, wherein the control ring which is in sliding contact with said housing is provided on its contact surface with an annular groove communicating with said pressure face.

9. An actuator as defined in claim 4, wherein the control ring which is in sliding contact with said housing is provided with said change-over valve connected between said high pressure side and said low pressure side and the contact surface of said ring being provided with an annular groove communicating with said change-over valve.

10. An actuator as defined in claim 4, including a stationary cylinder block, said cylinder block defining a control surface provided with openings communicating with respective cylinders of the block, a rotary shaft passing through the cylinder block and supporting for joint rotation a control plate slidably engaging said control surface and being provided with control grooves cooperating with said openings in said control surface, an axially displaceable pressure plate engageable with the other side of said rotary control plate, a housing surrounding said rotary control plate and said pressure plate and having ports for high pressure working medium and the low pressure working medium, said pressure plate having in its surface remote from said control plate a central recess and said housing supporting a piston like member slidably fitting into said recess and defining therewith said pressure space, said piston like member being formed with an axial bore including said pressure limiting valve and being coupled to a low pressure side, a change-over valve being formed in said pressure plate and communicating with said pressure space, the face of said pressure plate adjoining said control plate being provided with an annular groove communicating with said control groove in said pressure plate and further communicating via said change-over valve with said pressure space, and the periphery of said rotary control plate bounding together with said housing and said axially displaceable pressure plate an annular space communicating with one of said ports.

11. An actuator as defined in claim 4, including a stationary cylinder block defining a control space provided with openings communicating with respective cylinders of said block, a rotary shaft passing through said cylinder and supporting an eccentric, a control ring mounted for joint rotation on said eccentric, one face of said control ring being in sliding contact with said control surface of said cylinder block, a housing attached to said cylinder block and bounding with said control ring an annular space forming said high pressure side, an axially displaceable collar disposed in said housing and slidably engaging the face of said control ring which is remote from said control surface, the housing being provided with an annular groove for slidably accommodating a portion of said collar and for forming said pressure space, said pressure limiting valve and said change-over valve being arranged in said housing and communicating with said pressure space.

12. An actuator as defined in claim 4, wherein said pressure limiting valve includes a seat, and a ball spring biased against said seat.

13. A hydrostatic actuator for use with a hydraulic motor or pump having a high pressure port and a low pressure port, said actuator comprising two component parts separating a high pressure side connected to said high pressure port from a low pressure side connected to said low pressure port, said parts being movable relative to each other and defining a variable gap therebetween, hydrostatic means for adjusting the width of said gap between an open position and a sealing position in which said high pressure side is sealed off from said low pressure side, said adjusting means including a pressure space communicating with said high pressure side via a flow restrictor and with said low pressure side via a pressure limiting valve, and a piston-like member constituted by at least one of said component parts and cooperating with said pressure space to move said one component part relative to the other component part in response to the pressure in said pressure space, said actuator further including a change-over valve coupling said high pressure side and said low pressure side and being connected via said restrictor with the pressure space.

14. A hydrostatic actuator for use with a hydraulic motor or pump having a high pressure port and a low pressure port, said actuator comprising two component parts separating a high pressure side connected to said high pressure port from a low pressure side connected to said low pressure port, said parts being movable relative to each other and defining a variable gap therebetween, hydrostatic means for adjusting the width of said gap between an open position and a sealing position in which said high pressure side is sealed off from said low pressure side, said adjusting means including a pressure space communicating with said high pressure side via a flow restrictor and with said low pressure side via a pressure limiting valve, and a piston-like member constituted by at least one of said component parts and cooperating with said pressure space to move said one component part relative to the other component part in response to the pressure in said pressure space, said actuator further including a change-over valve directly coupled to said pressure space and being connected via a restrictor to said high pressure side and via another restrictor to said low pressure side.

* * * * *